UNITED STATES PATENT OFFICE 2,588,808

OIL BASE FLUID FOR DRILLING WELLS

Reginald D. Dawson, Compton, Calif., assignor to Shell Development Company, San Francisco, Calif., a corporation of Delaware No Drawing. Application February 14, 1949,
Serial No. 76,411

12 Claims. (Cl. 252—8.5)

This invention relates to the drilling of oil and gas wells and pertains more particularly to the use and composition of an improved oil base drilling fluid.

Drilling fluids or muds are generally used when drilling wells by the rotary method. These muds are usually pumped down through the drill stem of the rotary rig and around the drill bit, returning to the surface through the annular passage between the drill stem and the well casing. Drilling fluid, circulated in this manner during the operation of drilling, fulfills the various functions of carrying cuttings to the surface, cooling and lubricating the drilling tools, sealing the walls of the borehole by forming a mudsheath thereon, and supplying a static head to overcome pressures encountered during the drilling operations that tend to blow the fluid from the borehole.

A prime requisite of a satisfactory drilling emulsion or fluid is that it possesses a good gel structure, preferably a substantially thixotropic gel structure. In the event that the circulation of drilling fluid in the borehole suddenly fails, or is stopped, during drilling operations, it is a function of the drilling fluid to support the particles of weighting materials and rock cuttings and to prevent their settling to the bottom of the borehole.

Another requisite of a satisfactory drilling emulsion or fluid is that it possess good plastering or sheath-forming characteristics. That is, it must form on the walls of the borehole a mudsheath effectively preventing any appreciable fluid loss to the formation. Any substantial loss of fluid to the formation is undesirable at any time during the drilling, being especially dangerous and objectionable when drilling through heaving formations such as shale, or when drilling into the producing zone, which may be contaminated and plugged by said fluid.

A further desirable characteristic of a drilling emulsion is that it remain substantially stable after being contaminated with a salt solution. With many drilling emulsions there is a tendency of the oil and water to stratify in the presence of even moderately high concentrations of electrolytes, such, for example, as brines entering the borehole from the formation and becoming admixed with the drilling emulsion. There is also a tendency for the viscosity of drilling emulsions to increase when contaminated with a salt solution, thus imposing an additional load on the mud pumps used in circulating the drilling emulsion into and out of the borehole.

During the drilling of a well, several hundred or thousand barrels of a drilling emulsion may be used. Therefore, it is economically advantageous to employ a low cost drilling emulsion. Since the emulsifying agent is often one of the most expensive ingredients in a drilling emulsion, it is desirable to use one that is inexpensive and/or one which forms a satisfactory emulsion when only small quantities of the emulsifier are used.

The term oil and water emulsions includes two general types of emulsions: oil-in-water and water-in-oil. The present invention is mainly concerned with water-in-oil emulsions where the water is present in the disperse phase while the oil forms the continuous phase.

It is an object of this invention to provide an improved water-in-oil drilling emulsion possessing a substantially thixotropic gel structure, thereby being adapted to support weighting materials and drill cuttings carried by said emulsion.

It is also an object of the present invention to provide a relatively inexpensive drilling emulsion requiring only small quantities of an emulsifying agent incorporated therein.

Another object of this invention is to provide a drilling emulsion which is neither impaired by high temperatures nor affected by brine contamination to the same extent as ordinary drilling fluids.

These and other objects of this invention will be understood from the following detailed description of the invention.

The present invention can be practiced by adding an oil-soluble polyvalent (preferably di- or trivalent) metal salt or soap of a polynuclear carboxylic acid or the oxidized or disproportionated product thereof, preferably an oxidized or disproportionated resin acid such as rosin, to a mixture of water and oil as an emulsifying and stabilizing agent in forming drilling emulsions of the water-in-oil type or to an oil base mud as a gel promoting and stabilizing agent. The use of such an emulsifying agent yields an emulsion that forms a thin, impervious mudsheath on the borehole walls and thus prevents water, which is the internal phase from contaminating the producing formation. An outstanding advantage of the above oil base emulsions or fluids is that they possess a substantially thixotropic gel structure and exhibit little tendency to settle out or increase in viscosity when contaminated with salt water. Water-in-oil drilling emulsions incorporating soaps as emulsifying and stabilizing agents according to the present invention can also be used successfully in deep wells or in wells where the high temperatures are encountered as these emulsions remain relatively stable at high temperatures.

The polynuclear carboxylic acids which impart unusual characteristics to the drilling fluids of the present invention are those acids which have at least three fused rings in the nucleus and in which the carboxyl group is preferably attached directly to a nuclear carbon atom. The nuclear rings of the acids may be aromatic or non-aromatic but compounds are preferred that are non-aromatic such as abietic acid. Further, it is preferred that one of the rings of the nucleus be an unsaturated non-aromatic (alicyclic) hydrocarbon ring.

An especially effective class of acids are the resin acids, of which group the rosin acids such as abietic acid, l-pimaric acid, d-pimaric acid, sapinic acid, and mixtures of rosin acids such as occur in wood and gum rosin have proved outstanding in accomplishing the objects of this invention. It is preferred that modified acids, such as the oxidized or disproportionated acids be used. Any of the acids may be readily disproportionated by catalytic treatment or any other process of disproportionation, and the acids may be readily oxidized by blowing them with air, preferably at an elevated temperature of about 500° C.

The oil-soluble polyvalent metal soap of an oxidized resin acid is conveniently made simply by mixing the oxidized resin acid or an alkali metal soap thereof with an excess of an aqueous solution of a polyvalent metal hydroxide, e. g. calcium or magnesium hydroxide, and stirring the mixture with or without heating, as desired, until the reaction is complete. The oil-soluble polyvalent metal soap of an oxidized resin acid may also be readily prepared by mixing a resin acid with the oxide of a polyvalent metal, heating the mixture to a relatively high temperature, say 500° C., and blowing said mixture with air for an extended period, say 1 to 10 hours.

While any of the resin acids, or any mixture of resin acids, may be employed in accordance with this invention, abietic acid is preferred, since it is the most abundant in commercial quantities and because it is relatively inexpensive. Any of the polyvalent metals may be used in forming soaps of the resin acids but it is to be particularly noted that magnesium soaps are greatly preferred to others because the oil-soluble salts of this metal are more efficient emulsion promoters than other oil-soluble soaps.

In general, the polyvalent metal soaps of the above-described oxidized resin acids are oil-dispersable and or soluble, that is, they are dispersable in oil in the regard that they form a suspension or a solution therewith. However, if they are not sufficiently soluble to be employed according to the present invention, a small proportion (about 1 per cent by weight of the emulsifying agent) of any well-known solubilizer may be used such, for example, as alkyl phenols (di-tertiary-butyl phenol), higher alcohols (acetyl, stearyl, or abietyl alcohols), or the like. Normally, only small amounts of these polyvalent soaps of oxidized resin acids need be used as an emulsifier to obtain a satisfactory water-in-oil emulsion according to the present invention. The amount of emulsifier used may vary from about 0.4 per cent to about 2.0 per cent by weight, depending on the polyvalent resin acid soap used.

In general, excellent emulsions may be obtained with most of these soaps when about 1 per cent (by weight) of the emulsifier is used.

Drilling emulsions may comprise several components which commonly include a suspending component or medium, a suspended component, a plastering agent and an emulsifying and/or stabilizing agent. The suspending medium in the case of an emulsion of the present invention is formed of oil and water, said water preferably constituting from 10% to 40% by volume of the mixture. The continuous or oil phase of the present emulsion may be in the form of any suitable non-aqueous liquid such as a mineral oil, diesel oil, fuel oil, kerosene, stove oil and the like. A plastering agent such as a blown asphalt is commonly incorporated in the emulsion to seal the porous walls of the borehole by forming a sheath of mud thereon. The blown asphalt is preferably added to the oil phase prior to emulsification, in relatively small quantities such as from 5 to 15% on the weight of the oil phase. A suspended component in the form of a weighting material is generally in order to improve plastering to some extent and to add weight to the drilling emulsion to overcome any formation pressures encountered during drilling operations. Weighting materials commonly used are clay, crushed oyster shells, barites, hematite, magnetite, etc. However, for the purposes of the present invention the preferred weighting materials are those finely ground or powdered weighting materials which have a greater tendency to be wetted by oil than by water. The weighting material may constitute a substantial portion by weight of the drilling emulsion, e. g. in the range of 20 to 60 per cent.

Drilling emulsions prepared according to the present invention are found to have excellent gel structures with substantially thixotropic properties. It has also been found that emulsions incorporating extremely small quantities of soaps of oxidized resin acids exhibited greatly improved characteristics over drilling emulsions incorporating much larger quantities of some of the conventional emulsifiers for drilling emulsions.

For example, two water-in-oil drilling emulsions, weighted to 72 lbs. per cubic foot, were prepared. Emulsion No. 1 contained 0.7 per cent (by weight) of the magnesium soap oxidized abietic acid, which had been air blown for 4 hours, as an emulsifier. Emulsion No. 2 contained 2 per cent (by weight) of magnesium tallate as an emulsifier. The two emulsions were subjected to various tests. The viscosity and gel values were obtained with a Stormer viscosimeter. On standing, the initial gel and 10 minute gel in emulsion No. 2 was practically the same and rather low, while the 10 minute gel of emulsion No. 1 (resin acid soap) was substantially stronger. Considerable superiority in the top settling characteristic of emulsion No. 1 was noted at both 95° C. and 150° C. Top settling may be defined as the formation of a free oil layer on the top of a drilling emulsion upon standing at elevated temperatures. The plastering properties of both emulsions at elevated temperatures were excellent, as shown by the filter loss values.

A third emulsion was prepared using 0.7 per cent by weight of magnesium abietate as an emulsifier, wherein the abietic acid used was air blown for 8 hours as compared to 4 hours in emulsion No. 1.

These data are tabulated in the table hereinbelow:

| Viscosity | | Gel (Stormer) | | Settling—16 hrs. | | | Remarks | Filter Loss [1] |
|---|---|---|---|---|---|---|---|---|
| Grams | Temp. | Initial | 10 Min. | Temp. | Top | Bottom | | |
| EMULSION NO. 1 | | | | | | | | |
| | °C. | Gms. | Gms. | °C. | Per Cent | | | |
| 365 | 25 | 12 | 45 | 95 | 19 | 0 | Firm Gel | 0.18 |
| | | | | 150 | 27 | 0 | Firm Gel | |
| 270 | 45 | | | | | | | |
| 230 | 65 | | | | | | | |
| 153 | 85 | | | | | | | |
| 115 | 90 | | | | | | | |
| EMULSION NO. 2 | | | | | | | | |
| 292 | 25 | 6 | 7 | 95 | 50 | 0 | Soft Gel | 0.17 |
| | | | | 150 | 50 | 0 | Soft Gel | |
| 192 | 45 | | | | | | | |
| 125 | 65 | | | | | | | |
| 88 | 85 | | | | | | | |
| 70 | 90 | | | | | | | |
| EMULSION NO. 3 | | | | | | | | |
| 400 | 25 | 10 | 105 | 95 | 20 | 0 | | 0.15 |
| | | | | 150 | 31 | 0 | | |
| 273 | 45 | | | | | | | |

[1] Filter loss taken at 275° F. and 500 p. s. i., cc./sq.cm./hr.

It may be further noted from the above table that the 10 minutes' gel strength of an emulsion is more than doubled when the emulsifier used was made from more completely oxidized abietic acid. At the same time the viscosity and the settling characteristic of the mud was not unduly affected.

For ease of handling and lower costs of transportation, it is often desirable that the emulsifiers, stabilizers and plastering agents to be used in drilling fluids be made up in a dry form and then admixed with oil and water at the drilling location. It has been found that the present resin acids may be mixed with a suitable polyvalent metallic salt, such as magnesium oxide, to yield a hard brittle mass which may be readily incorporated into an emulsion, preferably after having been finely ground. When an abietic acid-magnesium oxide mixture has been air blown for 8 hours before being admixed to the mud, the resultant mud exhibits gel strengths and settling properties equal to those possessed by emulsion No. 3.

As mentioned previously, blown asphalt is often incorporated in a drilling mud as a plastering agent. The emulsifier of the present invention and blown asphalt may be readily manufactured together as a dry mixture by mixing suitable quantities of abietic acid and magnesium oxide with unblown asphalt and blowing the mixture with air, for, say, 8 hours at an elevated temperature such as 500° C. The resulting product, when added to a water and oil drilling emulsion, yields an emulsion having good plastering properties with other properties being comparable to those exhibited by emulsion 1 above:

If desired the dry powdered emulsifying agent of the present invention may be admixed with one or more other necessary ingredients to be added to a water-in-oil emulsion, such as a dry, powdered plastering agent, weighting material, and the like. Thus, the desired quantities of a polyvalent metal soap of an oxidized resin acid, blown asphalt and a weighting material may be prepared as a dry intimate powdered mixture which is transported to the drilling site. The powdered composition is then added to the water-in-oil drilling emulsion as it is being prepared at the drilling site.

Another important advantage possessed by drilling fluids made in accordance with this invention, is that the emulsions have no tendency to break down when contaminated with acids or acid materials.

Although the oxidized resin soaps of the present invention have been described hereinabove chiefly with reference to their use in emulsions especially formed as such by emulsifying water in mineral oil, these agents find an equally useful application in drilling fluids of other related types such as oil base muds and emulsions formed therefrom by the addition of water from the formations during the drilling process. Thus, for example, abietic acid, or the magnesium, aluminum or, in some cases, the sodium or potassium soaps thereof may be added in amounts such as 10 per cent or less to a regular oil base drilling fluid, that is, essentially a mixture of a mineral oil and a finely divided solid material, in which case such addition results in improving the gel structure and the plastering properties of the fluid. If, during drilling, said fluid becomes contaminated with water, in amounts such as 3 or more per cent, this additive acts as an emulsifier to convert the oil base drilling fluid into a drilling emulsion having the desirable properties described hereinabove.

The term abietic acid is used hereinbelow to denote the pure and technical grades of abietic acid, as well as the crude or refined grades of rosin, or any other material containing predominant or substantial amounts of an abietic acid, and therefore serving as a source of abietic acid, said material normally existing in a solid state.

I claim as my invention:

1. A drilling fluid for wells, comprising a water-in-oil emulsion, a finely divided solid material dispersed in said emulsion, and a small quantity of an emulsifying agent capable of stabilizing the emulsion, said emulsifying agent comprising an oil-dispersible polyvalent metal soap of an oxidized resin acid.

2. A drilling fluid for wells, comprising a water-in-oil emulsion, a finely divided solid weighting material dispersed in said emulsion, and a polyvalent metal soap of an oxidized rosin acid as the emulsifying agent.

3. A drilling fluid for wells, comprising a water-in-oil emulsion, a finely divided solid weighting material dispersed in said emulsion, an emulsifying agent comprising oil-dispersible polyvalent metal salts of a mixture of oxidized resin acids.

4. A drilling fluid for wells, comprising a water-in-oil emulsion, a finely divided weighting material dispersed in said emulsion, and a small quantity of an oil-dispersible divalent metal soap of oxidized abietic acid as an emulsifying agent.

5. A drilling fluid for wells, comprising a water-in-oil emulsion, a finely divided weighting material dispersed in said emulsion, and a small quantity of the magnesium soap of oxidized abietic acid as an emulsifying agent.

6. A drilling fluid for wells, comprising a water-in-oil emulsion wherein the water phase constitutes from 10 to 40 per cent by volume of the emulsion, a finely-divided weighting material dispersed in said emulsion, and an emulsifying agent capable of imparting a substantial thixotropic gel structure to said emulsion, said agent being present in amounts of from 0.4 to 2.0 per cent by weight of the total emulsion, said emulsifying agent consisting of an oil-dispersable divalent metal soap of oxidized abietic acid.

7. A composition for use in preparing a water and oil drilling fluid, said composition consisting essentially of a powdered mixture of from 95 to 70 per cent by weight of blown asphalt and from 5 to 30 per cent by weight of a polyvalent metal soap of an oxidized resin acid.

8. A powdered mixture for preparation of a water and oil drilling fluid when added to a water and oil emulsion, said mixture consisting essentially of an intimate mixture of a predominant amount of a finely divided weighting material, blown asphalt, and a relatively small quantity of a polyvalent metal soap of an oxidized resin acid in an amount equal to 5 to 30 per cent of the weight of the asphalt.

9. A drilling fluid for wells comprising a predominant quantity of a mineral oil and of a finely divided solid material dispersed therein, and an amount not exceeding 10 per cent by weight of abietic acid, said fluid being free from fatty acid soaps.

10. A water and oil drilling fluid for wells, comprising water, mineral oil, a polyvalent metal soap of an oxidized resin acid, and a finely-divided solid material adapted to increase the specific gravity of the fluid suspended therein.

11. A drilling fluid for wells comprising a predominant quantity of a mineral oil and of a finely divided solid material dispersed therein, and an amount not exceeding 10 per cent by weight of a polyvalent metal soap of an oxidized resin acid, said soap being present in an amount sufficient to produce an emulsion when mixed with water.

12. An oil base drilling fluid consisting essentially of a predominant quantity of a mineral oil and of a finely divided solid material dispersed therein, and an amount not exceeding 10 per cent by weight of a polyvalent metal soap of an oxidized resin acid, said soap being present in an amount sufficient to produce an emulsion when mixed with water.

REGINALD D. DAWSON.

REFERENCES CITED

The following references are of record in the file of this patent:

UNITED STATES PATENTS

| Number | Name | Date |
|---|---|---|
| 2,013,074 | Siegel | Sept. 3, 1935 |
| 2,099,825 | Rolshausen | Nov. 23, 1937 |
| 2,154,629 | Littman | Apr. 18, 1939 |
| 2,304,125 | Shutt et al. | Dec. 8, 1942 |
| 2,350,154 | Dawson | May 30, 1944 |
| 2,430,546 | Agnew | Nov. 11, 1947 |